US011702197B2

United States Patent
Gmirya et al.

(10) Patent No.: US 11,702,197 B2
(45) Date of Patent: Jul. 18, 2023

(54) COAXIAL SPLIT TORQUE GEARBOX WITH SEQUENTIAL LOAD DISTRIBUTION

(71) Applicant: LOCKHEED MARTIN CORPORATION, Bethesda, MD (US)

(72) Inventors: Yuriy Gmirya, Woodbridge, CT (US); Christopher Charles Pierce, New Haven, CT (US); Peter X. Palcic, Hamden, CT (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 575 days.

(21) Appl. No.: 16/823,432

(22) Filed: Mar. 19, 2020

(65) Prior Publication Data
US 2021/0291972 A1    Sep. 23, 2021

(51) Int. Cl.
*B64C 27/12*    (2006.01)
*B64C 27/10*    (2023.01)
*F16H 1/22*     (2006.01)
*B64D 35/06*    (2006.01)

(52) U.S. Cl.
CPC .............. *B64C 27/12* (2013.01); *B64C 27/10* (2013.01); *B64D 35/06* (2013.01); *F16H 1/22* (2013.01)

(58) Field of Classification Search
CPC ......... B64C 27/10; B64C 27/12; B64D 35/06; F16H 1/22
USPC .............................................. 74/664; 244/60
See application file for complete search history.

(56) References Cited

U.S. PATENT DOCUMENTS

| 3,824,875 | A | | 7/1974 | Willert et al. | |
|---|---|---|---|---|---|
| 4,682,512 | A | | 7/1987 | Peterson | |
| 5,113,713 | A | * | 5/1992 | Isabelle | F16H 55/14 74/411 |
| 5,117,704 | A | * | 6/1992 | Kish | F16H 55/14 74/411 |
| 5,135,442 | A | * | 8/1992 | Bossler, Jr. | F16H 1/222 475/343 |
| 5,528,960 | A | * | 6/1996 | Nagao | F16H 1/22 74/665 GD |
| 5,813,292 | A | | 9/1998 | Kish et al. | |
| 6,364,611 | B1 | * | 4/2002 | Matsuda | B64C 27/14 416/170 R |

(Continued)

FOREIGN PATENT DOCUMENTS

| CN | 1068998 A |   | 2/1993 | |
|---|---|---|---|---|
| CN | 105383690 A | * | 3/2016 | ............. B64C 27/12 |

(Continued)

OTHER PUBLICATIONS

European Patent Office Search Report and Written Opinion for Application No. 21160366.7 dated Aug. 11, 2021 (12 pages).

*Primary Examiner* — Joseph Brown
(74) *Attorney, Agent, or Firm* — Michael Best & Friedrich LLP

(57) ABSTRACT

A coaxial split torque gearbox comprises a first pinion meshed with a first gear; a second pinion attached to the first gear and meshed with a first bull gear, the first bull gear operable for transferring torque to cause a first rotor to rotate; and a third pinion attached to a second gear and meshed with a second bull gear, the second bull gear operable for transferring torque to cause a second rotor to rotate, the second gear being meshed with the first gear, and a number of teeth of the first gear being different than a number of teeth of the second gear.

20 Claims, 5 Drawing Sheets

(56) References Cited

U.S. PATENT DOCUMENTS

| | | | |
|---|---|---|---|
| 9,278,760 B2 | 3/2016 | Garcia | |
| 10,822,076 B2* | 11/2020 | Hunter | B64C 27/14 |
| 2004/0211278 A1* | 10/2004 | Gmirya | B64C 27/12 |
| | | | 74/409 |
| 2005/0011307 A1* | 1/2005 | Gmirya | F16H 1/22 |
| | | | 74/665 GA |
| 2006/0266883 A1* | 11/2006 | Gmirya | B64C 27/14 |
| | | | 244/60 |
| 2009/0277299 A1* | 11/2009 | Gmirya | F16H 1/22 |
| | | | 74/665 A |
| 2010/0314492 A1* | 12/2010 | Stamps | F16H 1/22 |
| | | | 74/650 |
| 2015/0060596 A1* | 3/2015 | Garcia | B64C 27/10 |
| | | | 244/17.23 |
| 2015/0354668 A1 | 12/2015 | Bouwer | |
| 2017/0210463 A1* | 7/2017 | Koessick | B64C 27/001 |

FOREIGN PATENT DOCUMENTS

| | | |
|---|---|---|
| EP | 3041737 A1 | 7/2016 |
| WO | 2015034732 A1 | 3/2015 |

* cited by examiner

COAXIAL SPLIT TORQUE GEARBOX WITH SEQUENTIAL LOAD DISTRIBUTION

BACKGROUND

Exemplary embodiments relate to torque transmission for a coaxial rotary-wing aircraft, and more particularly, to a coaxial split torque gearbox with sequential load distribution.

A gearbox transfers power from an engine to one or more rotors of an aircraft. The gearbox is the primary mechanism for power transfer from the engines to the main rotors. A portion of the power from the engine is transferred to a propulsor or thrust propeller. A rotary wing aircraft gearbox transfers power from an engine, or multiple engines, for example, a turbine engine, to the rotor system. A conventional gearbox directs power from the engine to a single rotor system, including a plurality of rotor blades. As the rotational velocity of the rotor is typically lower than the rotational velocity of the engine, the gearbox is used to reduce the rotational velocity of the turbine engine. Torque is subsequently increased through a series of intermediate gear stages and shafts, with an output velocity provided to the rotor system.

In other rotary wing aircraft with more complex rotor systems, the complexity of the gearbox typically also increases. For example, a coaxial rotary wing aircraft has two coaxial counter-rotating main rotor assemblies. As such, the gearbox is configured to transfer engine power to both rotor assemblies at the required directions of rotation, requiring two large final reduction stages. Furthermore, in some aircraft, the gearbox is further utilized to transfer power to a propulsor, typically located at a tail of the rotary wing aircraft, to provide additional forward thrust.

BRIEF DESCRIPTION

According to one embodiment, a coaxial split torque gearbox comprises a first pinion meshed with a first gear; a second pinion attached to the first gear and meshed with a first bull gear, the first bull gear operable for transferring torque to cause a first rotor to rotate; and a third pinion attached to a second gear and meshed with a second bull gear, the second bull gear operable for transferring torque to cause a second rotor to rotate, the second gear being meshed with the first gear, and a number of teeth of the first gear being different than a number of teeth of the second gear.

In addition to one or more of the features described above or below, or as an alternative, a number of teeth of the first bull gear is different than a number of teeth of the second bull gear.

In addition to one or more of the features described above or below, or as an alternative, a number of teeth of the second pinion is different than a number of teeth of the third pinion.

In addition to one or more of the features described above or below, or as an alternative, the first pinion is meshed with a third gear, and wherein the third gear is attached to a fourth pinion that is meshed with the first bull gear.

In addition to one or more of the features described above or below, or as an alternative, the second pinion is connected to the first gear by a first connecting member, and wherein the third pinion is connected to the second gear by a second connecting member.

In addition to one or more of the features described above or below, or as an alternative, the first connecting member and the second connecting member each comprise a respective quill shaft.

In addition to one or more of the features described above or below, or as an alternative, the first gear and the second gear are arranged such that a respective portion of the first gear and the second gear are radially inward from the circumference of the second bull gear.

In addition to one or more of the features described above or below, or as an alternative, the number of gear and pinion teeth is defined by the following:

$$Nb1 * Ng1/Np1 = Nb2 * Ng2/Np2,$$

wherein $Nb1$ is a number of first bull gear teeth, $Ng1$ is a number of first gear teeth, $Np1$ is a number of second pinion teeth, $Nb2$ is a number of second bull gear teeth, $Ng2$ is a number of second gear teeth, and $Np2$ is a number of third pinion teeth.

In addition to one or more of the features described above or below, or as an alternative, the first pinion is in mechanical communication with an input stage gear and an input stage pinion.

According to another embodiment, a coaxial rotary-wing aircraft comprises a first rotor rotatable about a first axis in a first direction and a second rotor rotatable about the first axis in a second direction; and a gearbox comprising: a first pinion meshed with a first gear; a second pinion attached to the first gear and meshed with a first bull gear, the first bull gear operable for transferring torque to cause the first rotor to rotate; and a third pinion attached to a second gear and meshed with a second bull gear, the second bull gear operable for transferring torque to cause the second rotor to rotate, the second gear being meshed with the first gear, and a number of teeth of the first gear being different than a number of teeth of the second gear.

In addition to one or more of the features described above or below, or as an alternative, the aircraft further comprises a first rotor shaft arranged radially inward from the first bull gear and the second bull gear, wherein the first rotor shaft is in mechanical communication with the first rotor and the second bull gear; and a second rotor shaft arranged radially inward from the first rotor shaft, wherein the second rotor shaft is in mechanical communication with the second rotor and the first bull gear.

In addition to one or more of the features described above or below, or as an alternative, a number of teeth of the first bull gear is different than a number of teeth of the second bull gear.

In addition to one or more of the features described above or below, or as an alternative, a number of teeth of the second pinion is different than a number of teeth of the third pinion.

In addition to one or more of the features described above or below, or as an alternative, the first pinion is meshed with a third gear, and wherein the third gear is attached to a fourth pinion that is meshed with the first bull gear.

In addition to one or more of the features described above or below, or as an alternative, the second pinion is connected to the first gear by a first connecting member, and wherein the third pinion is connected to the second gear by a second connecting member.

In addition to one or more of the features described above or below, or as an alternative, the first gear and the second gear are arranged such that a respective portion of the first gear and the second gear are radially inward from the circumference of the second bull gear.

In addition to one or more of the features described above or below, or as an alternative, the aircraft further comprises a first engine for causing a torque to be applied to the first pinion.

In addition to one or more of the features described above or below, or as an alternative, the aircraft further comprises a second engine for causing a torque to be applied to the first pinion.

In addition to one or more of the features described above or below, or as an alternative, the first bull gear and the second bull gear are arranged in a double-helical configuration.

In addition to one or more of the features described above or below, or as an alternative, the aircraft further comprises a translational thrust system comprising a propeller rotor connected to and driven by an engine via the gearbox.

BRIEF DESCRIPTION OF THE DRAWINGS

The following descriptions should not be considered limiting in any way. With reference to the accompanying drawings, like elements are numbered alike.

DETAILED DESCRIPTION

Figure 1A:
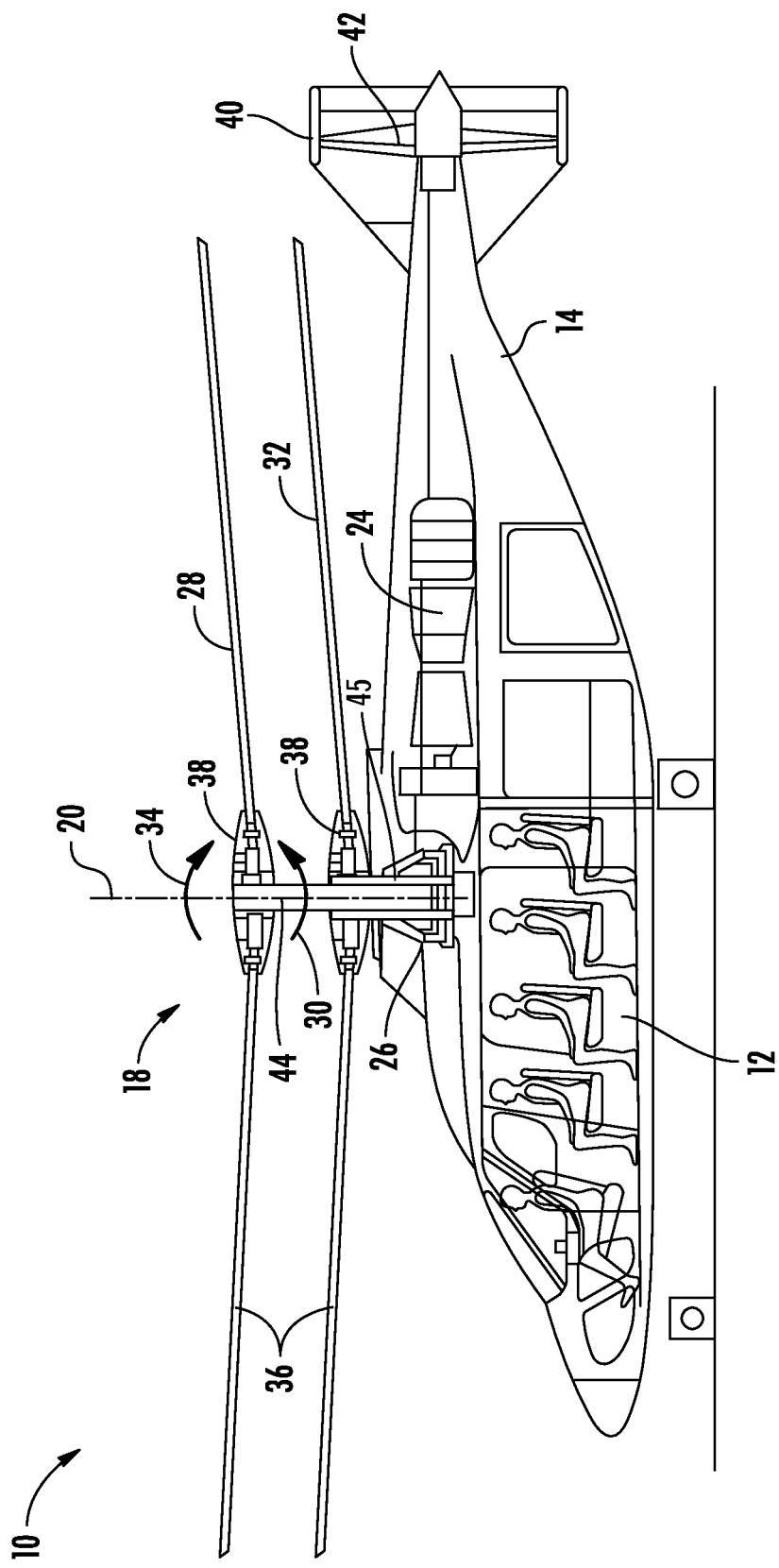
FIG. 1A depicts a side view of a coaxial rotary-wing aircraft in accordance with an exemplary embodiment.

A detailed description of one or more embodiments of the disclosed apparatuses is presented herein by way of exemplification and not limitation with reference to the Figures.

The packaging requirements for a coaxial aircraft limits the available envelope for a main gearbox (MGB). This is due to the space required for flight controls located above, through, and below the rotor shafts of the MGB. Some methods attempt to maximize the use of available space by utilizing a split torque MGB with a large diameter main rotor shaft. The disadvantages to this approach include a tall height, a heavy final stage, and a limited reduction ratio, which results in an increased weight of the upstream gears.

Furthermore, split-torque gearboxes require a large number of gears, bearings, and shafts to run multi-path power transmission from input shafts to output shafts. Some split torque gearboxes employ bevel gear modules to combine distributed load in the last stage of reduction around an output bull gear. However, the bevel modules occupy significant space and complicate the packaging of the control and other systems around the main transmission. Gearboxes for coaxial rotary wing aircraft require a large number and volume of flight control components, which are located throughout the main gearbox. Increasing gearbox size in any direction leads to an increase in the weight and envelope of the flight control components.

Exemplary embodiments of the present disclosure address these issues by providing a multi-pinion MGB arrangement with a placement of a second stage and third stage gear train that allows for the placement of multiple torque split gears in a compact envelope. The gearbox consists of three stages of reduction, where the first stage utilizes an input apparatus in operable communication with a set of gears, the second stage includes the set of gears, and the third output stage combines the power in two counter-rotating double helical bull gears. The second stage gears and the third stage pinions are connected by torsionally compliant quill shafts that provide balanced load sharing between redundant gear train components. Additionally, the herein described gear system permits variance in the number of second stage gears, and consequently, third stage pinions based on a desired number of splits.

With the addition of the sequential split torque, the overall height, the number of parts, and the weight of the MGB design is reduced. The decreased height also allows more room for upper & lower rotor swashplates as well as bringing structural load paths from the main rotors to the airframe. As such, the exemplary embodiments described herein provide a lightweight solution, that enables increased availability for multiple load paths with balanced load sharing capabilities. Embodiments of the present invention allow for a reduction in the overall diameter of the gears. The torque splitting gears are arranged such that an outer circumference around the gears is inward from the gearbox, thereby providing space for the flight controls to be arranged between the gears and the gearbox. In other words, the gears can be arranged inward from the flight controls. This opposed to a gearbox, in which the size of the gears is such that an outer circumference of the gears nearly reaches the gearbox. This results in the flight controls being arranged above and below the gears.

Figure 1B:
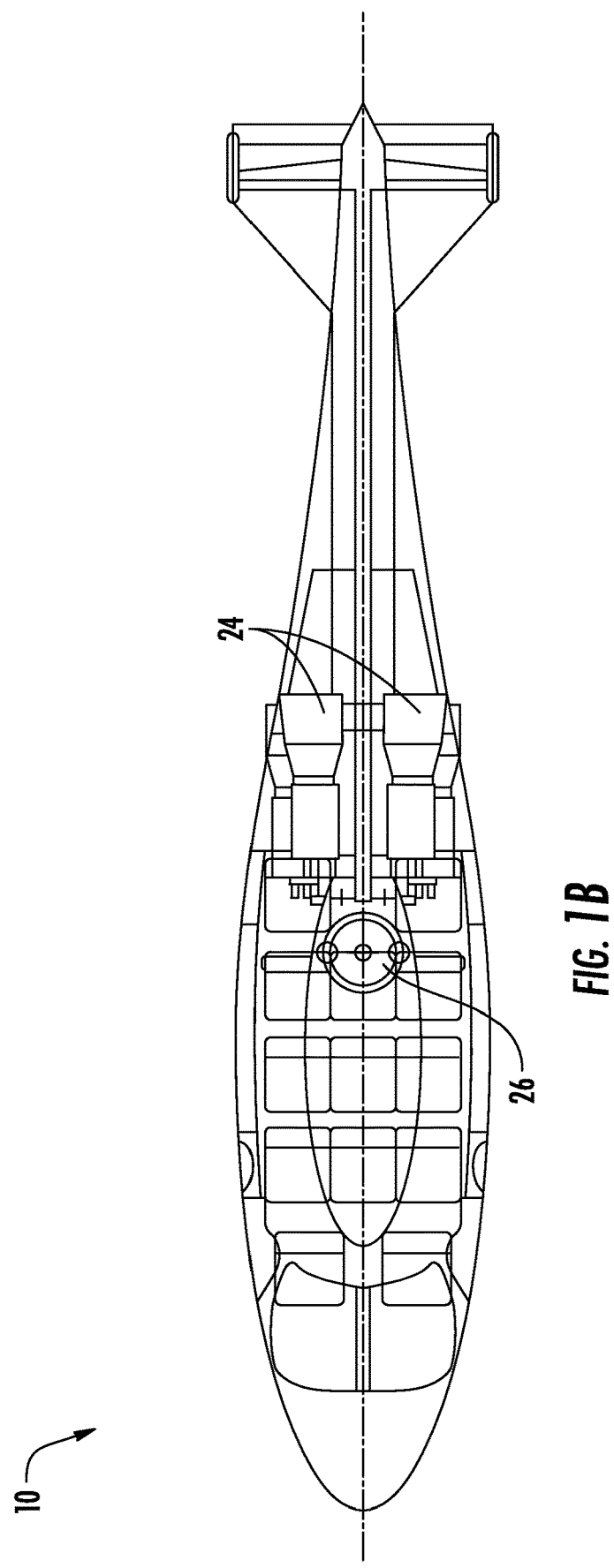
FIG. 1B depicts a plan view of a rotary view aircraft in accordance with an exemplary embodiment.

Shown in FIGS. 1A and 1B, is a schematic view of an embodiment of a rotary-wing aircraft 10. The coaxial rotary-wing aircraft 10 includes an airframe 12 with an extending tail 14. A dual, counter-rotating coaxial main rotor assembly 18 is located at the airframe 12 and rotates about a main rotor axis/first axis 20. The main rotor assembly 18 is driven by a power source, for example, an engine 24 via a gearbox 26. The main rotor assembly 18 includes an upper rotor assembly 28 driven in a first direction 30 about the main rotor axis 20, and a lower rotor assembly 32 driven in a second direction 34 about the main rotor axis 20, opposite, but at the same or substantially same rotational speed, to the first direction 30.

While, in FIG. 1A, the first direction 30 is illustrated as counterclockwise and the second direction 34 is illustrated as clockwise, it is to be appreciated that in some embodiments, the directions of rotation of the upper rotor assembly 28 and lower rotor assembly 32 may be reversed. Each of the upper rotor assembly 28 and the lower rotor assembly 32 include a plurality of rotor blades 36 secured to a rotor hub 38. In some embodiments, the rotary-wing aircraft 10 further includes a translational thrust system 40 located at the extending tail 14 to provide translational thrust for the rotary-wing aircraft 10. The translational thrust system 40 includes a propeller rotor 42 connected to and driven by the engine 24 via the gearbox 26. While shown in the context of a pusher-prop configuration, it is understood that the propeller rotor 42 could also be a puller prop or could be variably facing so as to provide torque in addition to or instead of translational thrust. It should be appreciated that although FIGS. 1A and 1B depict a coaxial rotary-wing aircraft 10 with a propeller rotor 42, the herein described gearbox arranged is operable to function in connection with a rotary-wing aircraft that does not include a propeller rotor 42.

Figure 2:
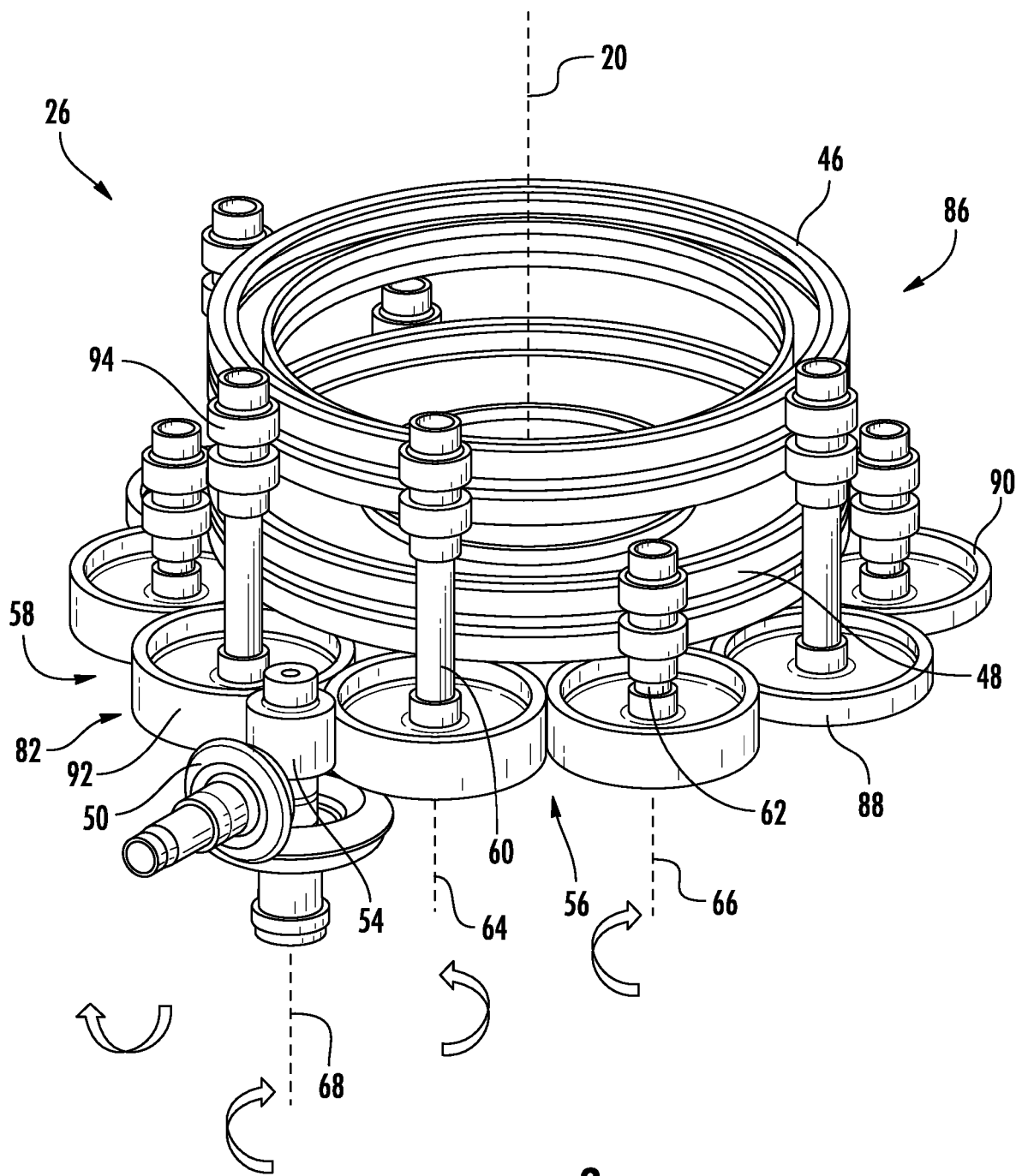
FIG. 2 depicts a perspective view of a gearbox for a coaxial rotary-wing aircraft in accordance with an exemplary embodiment.
Figure 3:
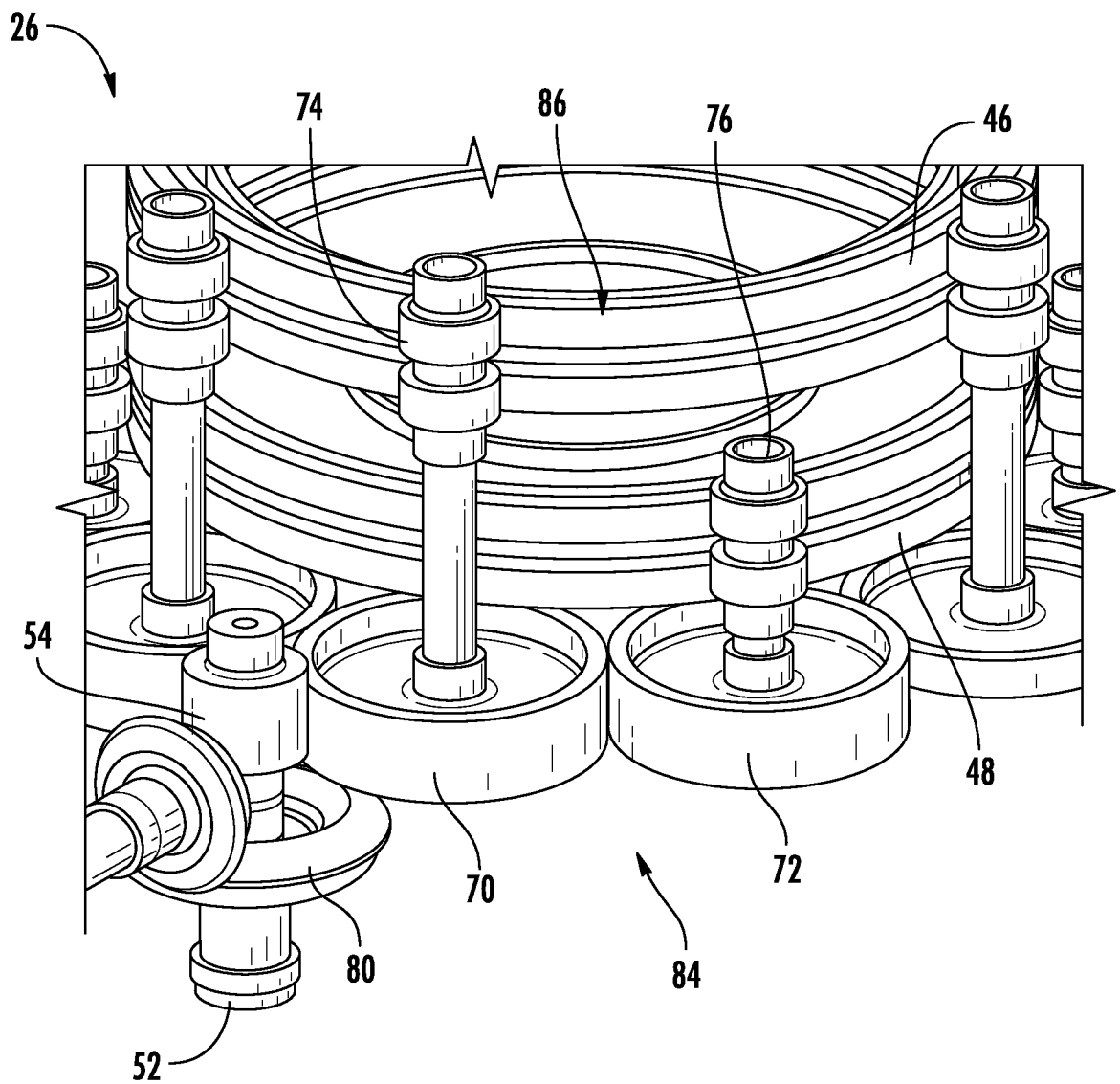
FIG. 3 depicts an expanded perspective view of a gearbox for a coaxial rotary-wing aircraft in accordance with an exemplary embodiment.

Shown in FIGS. 2 and 3 are perspective views of embodiments of a gearbox 26 in mechanical communication with an input mechanism 52. The gearbox 26 includes an upper bull gear 46 and a lower bull gear 48 which rotate about the axis 20. The upper bull gear 46 is located about the main rotor axis 20 and is in operable communication with the lower rotor assembly 32 by a lower rotor shaft 45 extending along the main rotor axis 20. The lower bull gear 48 is also located about the main rotor axis 20 and is connected to the upper rotor assembly 28 via an upper rotor shaft 44, which is arranged radially inward from the lower rotor shaft 45.

The gearbox 26 further includes a first reduction stage 82, which is operable to transfer torque from the first pinion 54 to the lower rotor assembly 32 and the upper rotor assembly 28. As illustrated, the first pinion 54 is in operable communication with an input mechanism 52. It should be appreciated that although the illustrated input mechanism 52 includes an input stage pinion 50, and an input stage gear 80, the input mechanism 52 may include any configuration operable to transfer a torque from an engine to the first pinion 54. The engine 24 is in operable communication with the gearbox 26 via the input mechanism 52. In some embodiments, the input stage pinion 50 includes, for example, a spiral bevel pinion and the input stage gear 80 includes an input spiral bevel gear.

The gearbox 26 includes a second reduction stage 84, which includes first pinion 54 for driving a second stage gear set 56. The first pinion 54 is meshed with the second stage gear set 56 that includes a first gear 70 and a second gear 72. As needed, an additional gear set 58 or subsequent gear set can be added. The additional gear set 58 or subsequent gear set may be identical to the second stage gear set 56. The additional gear set 58 or subsequent gear set can be arranged as a mirror-image of the second stage gear set 56 or identically to the second stage gear set 56. As described herein, a description of a second stage gear set 56 applies to the additional gear set 58 or any subsequent gear set. As illustrated in FIG. 2, the first pinion 54 is meshed with a third gear 92 that is connected to a fourth pinion 94. The fourth pinion 94 is meshed with the upper bull gear 46.

The first gear 70 and the second gear 72 are respectively connected to a second pinion 74 and a third pinion 76 via first and second connecting members 60, 62. In some embodiments, the first connecting member 60 and the second connecting member 62 are quill shafts. The first gear 70 and the second gear 72 are respectively rotatable about a first gear axis 64 and a second gear axis 66. The second pinion 74 and a third pinion 76 are also respectively rotatable about the first gear axis 64 and the second gear axis 66. In some embodiments, the first gear axis 64, the second gear axis 66, the main rotor axis 20, and a first pinon axis 68 are substantially parallel to each other.

The first gear 70 is connected to the second pinion 74 via the first connecting member 60. The second gear 72 is connected to third pinion 76 via the second connecting member 62. The first and second connecting members 60, 62 transmit power from the second stage gear set 56 to the third stage gear set 86 and allow for load sharing. The second pinion 74 is meshed with the upper bull gear 46 and the third pinion 76 is meshed with the lower bull gear 48.

It should be appreciated that although FIG. 2 illustrates multiple gear sets, embodiments of the present invention can include a greater or fewer number of gear sets, based on a desired number of splits. As described above, the herein described design permits the addition or subtraction of gears. A fourth gear 88 can be meshed with the second gear 72. This additional gear can rotate in a reverse direction from second gear 72 and provide another torque path to the lower rotor assembly 32 via the upper bull gear 46. A fifth gear 90 may be meshed with the fourth gear 88 and provide torque to the upper rotor assembly 28 via the lower bull gear 48. This process can be repeated as many times as is favorable for a given application, within the geometrical constraints of the gearbox 26.

The lengths of the first connecting member 60 and the second connecting member 62 are configured to permit the second pinion 74 and the third pinion 76 to engage the upper bull gear 46 and the lower bull gear 48, respectively. The lengths of the first connecting member 60 and the second connecting member 62 are configured to extend to a length that permits the first gear 70 and the second gear 72 to be arranged partially underneath the lower bull gear 48. In other words, the first gear 70 and the second gear 72 are arranged such that a portion of the first gear 70 and the second gear 72 are radially inward from the outer circumference of the lower bull gear 48. As a result, an overall footprint of the gears is minimized to provide further space for the flight controls of an aircraft.

The gearbox 26 further includes a third stage gear set 86, which includes the upper bull gear 46 and the lower bull gear 48, as shown in a double-helical configuration. It should be appreciated that although a double-helical configuration is illustrated, the third reduction state could include a spur or single helical configuration. The second pinion 74 is engaged to the upper bull gear 46 and the third pinion 76 is engaged to the lower bull gear 48. The upper bull gear 46 and the lower bull gear 48 are respectively operable to cause the upper rotor assembly 28 and the lower rotor assembly 32 to rotate in counter directions.

The engine 24 transmits torque and rotational speed to the gearbox 26. A clockwise rotation of the first pinion 54 causes a counterclockwise rotation of the first gear 70. A torque is transmitted from the second stage gear set 56 to the third stage gear set 86 through the second pinion 74, which is engaged to the upper bull gear 46. The counterclockwise rotation of the first gear 70 causes the second pinion 74 to also rotate in a counterclockwise rotation. The counterclockwise rotation of the second pinion 74 causes the upper bull gear 46 and, consequently, the lower rotor assembly 32 to rotate in a clockwise rotation.

A torque is also transmitted from the second stage gear set 56 through to the third stage gear set 86 through the third pinion 76, which is engaged to the lower bull gear 48. The counterclockwise rotation of the first gear 70 causes the second gear 72 and, consequently, the third pinion 76 to rotate in a clockwise rotation. The clockwise rotation of the third pinion 76 causes the lower bull gear 48 and, consequently, the upper rotor assembly 28 to rotate in a counterclockwise rotation. It should be appreciated that the rotation can be reversed, such that the rotation of the first pinion 54 and each subsequent downstream gear is reversed from the direction described herein.

The fourth gear 88 transmits the torque from the second gear 72 to the upper bull gear 46 via another pinion. The fifth gear 90 transmits the torque from the fourth gear 88 to the lower bull gear 48 via another pinion. Further, while not fully illustrated, an additional fourth gear 88 and the fifth gear 90 transmit torque from the input stage gear 80 on an opposite side of the bull gears 46, 48 such that an equal numbers of gears are on opposite sides of the input stage gear 80.

Figure 4:
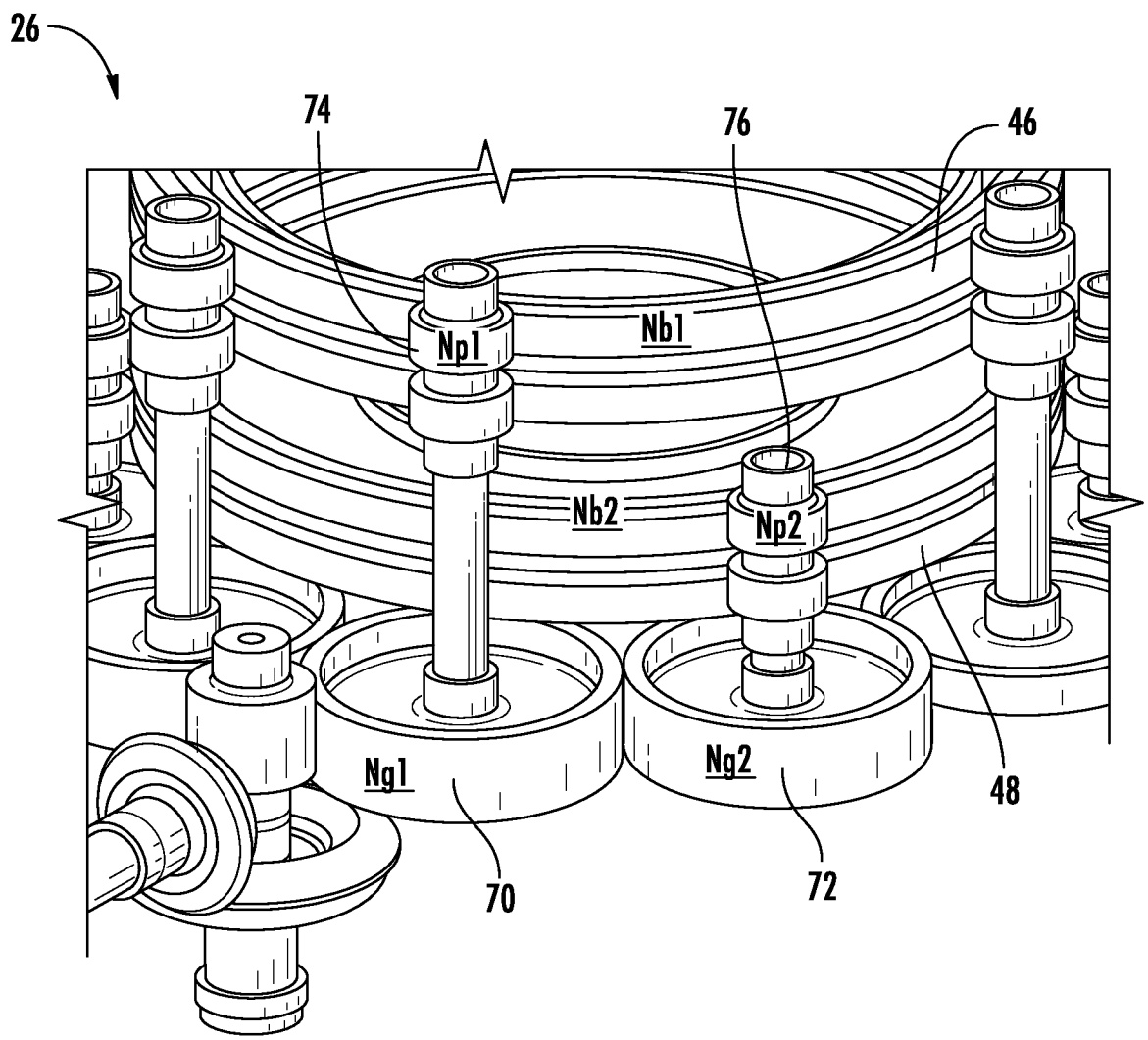
FIG. 4 depicts an expanded perspective view of a gearbox for a coaxial rotary-wing aircraft in accordance with an exemplary embodiment.

FIG. 4 illustrates a potential number of teeth for a side of the gearbox 26 according to some embodiments of the present disclosure. Each label Nb1, Nb2, Ng1, Ng2, Np1, Np2 indicates the number of gear teeth on each individual gear member. The rotational speeds of both output shafts must be identical to cause the upper rotor assembly 28 and the lower rotor assembly 32 to rotate at the same angular velocity. The reduction ratio from the first stage to the third stage of reduction must be the equivalent for both the upper bull gear 46 and the lower bull gear 48. However, the respective reduction ratios in the second stage and third stage can be varied to maintain hunting or partial meshes in all stages of the gearbox 26.

The gearbox 26 uses hunting and partial hunting meshes for the second and the third stages of reduction. For a hunting mesh configuration, one pinion gear tooth comes into contact with all mating teeth. For a partial hunting mesh configuration any one pinion tooth comes into contact with only a set of a few of the mating gear teeth, and with a different set of teeth during subsequent rotations. In some embodiments, to achieve hunting or partial hunting mesh, the number of teeth of the first gear 70 are different than the number of teeth of the second gear 72.

In some embodiments, to achieve equal and opposite rotation, the number of teeth of the second pinion 76 is different than the number of teeth of the third pinion 78 and/or the number of teeth of the upper bull gear 46 are different than the number of the of the lower bull gear 48.

The number of teeth of the gears in these stages may be described by the following relationship:

$$Nb1*Ng1/Np1=Nb2*Ng2/Np2,$$

where Nb is a number of teeth in a bull gear, Ng is a number of teeth in a spur gear, and Np is a number of teeth in a pinion.

The following is one example of how to reach a hunting mesh for the gearbox 26. If, for example, the upper and lower bull gears 46, 48 and the second and third pinions 74, 76 have the same number of teeth, (i.e., Nb1=Nb2 and Np1=Np2), then Ng1=Ng2 to satisfy the requirement for equal and opposite rotation. However, this results in non-hunting meshes in the second reduction stage 84. Therefore, a hunting mesh can be obtained by choosing a value for Ng1 or Ng2 such that Nb1 Nb2 and/or Np1 Np2, and finding combinations of values for Ng1 and Ng2, which have no common denominator to satisfy the above equation. This can be achieved, for example, by having Ng1 and Ng2 vary by a small number of teeth, setting Np1=Np2, and setting Nb2=m*Ng1 and Nb1=m*Ng2, where m is an integer.

The above-described gearbox 26 configuration is compatible with a single engine aircraft or an additional second engine that will be engaged to the gearbox 26. It should be appreciated that the gearbox 26 is not limited to above-described gear type and number of gears.

The terms "about," "substantially," "approximately," and variations thereof, are intended to include the degree of error associated with measurement of the particular quantity based upon the equipment available at the time of filing the application. For example, "about" can include a range of ±10%, or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A coaxial split torque gearbox comprising:
   a first pinion meshed with a first gear;
   a second pinion attached to the first gear and meshed with a first bull gear, the first bull gear operable for transferring torque to cause a first rotor to rotate at an angular velocity and in a first direction; and
   a third pinion attached to a second gear and meshed with a second bull gear, the second bull gear operable for transferring torque to cause a second rotor to rotate at the angular velocity of the first rotor and in a second direction opposite the first direction, the second gear being meshed with the first gear in one of a hunting mesh and a partial hunting mesh, and a number of teeth of the first gear being different than a number of teeth of the second gear,
   wherein a number of gear and pinion teeth is defined by the following:

$$Nb1*Ng1/Np1=Nb2*Ng2/Np2,$$

wherein Nb1 is a number of first bull gear teeth, Ng1 is the number of first gear teeth, Np1 is a number of second pinion teeth, Nb2 is a number of second bull gear teeth, Ng2 is the number of second gear teeth, and Np2 is a number of third pinion teeth.

2. The coaxial split torque gearbox of claim 1, wherein the number of teeth of the first bull gear is different than the number of teeth of the second bull gear.

3. The coaxial split torque gearbox of claim 1, wherein the number of teeth of the second pinion is different than the number of teeth of the third pinion.

4. The coaxial split torque gearbox of claim 1, wherein the first pinion is meshed with a third gear, and wherein the third gear is attached to a fourth pinion that is meshed with the first bull gear.

5. The coaxial split torque gearbox of claim 1, wherein the second pinion is connected to the first gear by a first connecting member, and wherein the third pinion is connected to the second gear by a second connecting member.

6. The coaxial split torque gearbox of claim 5, wherein the first connecting member and the second connecting member each comprise a respective quill shaft.

7. The coaxial split torque gearbox of claim 1, wherein the first gear and the second gear are arranged such that a respective portion of the first gear and the second gear are radially inward from a circumference of the second bull gear.

8. The coaxial split torque gearbox of claim 1, wherein the first pinion is in mechanical communication with an input stage gear and an input stage pinion.

9. The coaxial split torque gearbox of claim 1, further comprising an input stage gear, a third gear meshed with the first pinion, a fourth gear meshed with the second gear, and a fifth gear meshed with the fourth gear, wherein an equal number of gears are on opposite sides of the input stage gear such that four gears transmit torque to the first bull gear and four gears transmit torque to the second bull gear.

10. A coaxial rotary-wing aircraft comprising:
a first rotor rotatable about a first axis in a first direction and a second rotor rotatable about the first axis in a second direction opposite the first direction to provide lift, the first rotor and the second rotor rotatable at a same angular velocity; and
a gearbox comprising:
a first pinion meshed with a first gear;
a second pinion attached to the first gear and meshed with a first bull gear, the first bull gear operable for transferring torque to cause the first rotor to rotate; and
a third pinion attached to a second gear and meshed with a second bull gear, the second bull gear operable for transferring torque to cause the second rotor to rotate, the second gear being meshed with the first gear in one of a hunting mesh and a partial hunting mesh, and a number of teeth of the first gear being different than a number of teeth of the second gear,
wherein a number of gear and pinion teeth is defined by the following:

$$Nb1*Ng1/Np1=Nb2*Ng2/Np2,$$

wherein Nb1 is a number of first bull gear teeth, Ng1 is the number of first gear teeth, Np1 is a number of second pinion teeth, Nb2 is a number of second bull gear teeth, Ng2 is the number of second gear teeth, and Np2 is a number of third pinion teeth.

11. The coaxial rotary-wing aircraft of claim 10, further comprising:
a first rotor shaft arranged radially inward from the first bull gear and the second bull gear, wherein the first rotor shaft is in mechanical communication with the first rotor and the first bull gear; and
a second rotor shaft arranged radially inward from the first rotor shaft, wherein the second rotor shaft is in mechanical communication with the second rotor and the second bull gear.

12. The coaxial rotary-wing aircraft of claim 10, wherein the number of teeth of the first bull gear is different than the number of teeth of the second bull gear.

13. The coaxial rotary-wing aircraft of claim 10, wherein the number of teeth of the second pinion is different than the number of teeth of the third pinion.

14. The coaxial rotary-wing aircraft of claim 10, wherein the first pinion is meshed with a third gear, and wherein the third gear is attached to a fourth pinion that is meshed with the first bull gear.

15. The coaxial rotary-wing aircraft of claim 10, wherein the second pinion is connected to the first gear by a first connecting member, and wherein the third pinion is connected to the second gear by a second connecting member.

16. The coaxial rotary-wing aircraft of claim 10, wherein the first gear and the second gear are arranged such that a respective portion of the first gear and the second gear are radially inward from a circumference of the second bull gear.

17. The coaxial rotary-wing aircraft of claim 10, further comprising a first engine for causing a torque to be applied to the first pinion.

18. The coaxial rotary-wing aircraft of claim 17, further comprising a second engine for causing a torque to be applied to the first pinion.

19. The coaxial rotary-wing aircraft of claim 10, wherein the first bull gear and the second bull gear are arranged in a double-helical configuration.

20. The coaxial rotary-wing aircraft of claim 10, further comprising a translational thrust system comprising a propeller rotor connected to and driven by an engine via the gearbox.

* * * * *